June 11, 1968        G. L. CANN        3,388,291

ANNULAR MAGNETIC HALL CURRENT ACCELERATOR

Filed Aug. 31, 1964        3 Sheets-Sheet 1

GORDON L. CANN,
INVENTOR.

BY HIS ATTORNEYS

Spensley & Horn

June 11, 1968  G. L. CANN  3,388,291
ANNULAR MAGNETIC HALL CURRENT ACCELERATOR
Filed Aug. 31, 1964  3 Sheets-Sheet 2

GORDON L. CANN,
INVENTOR.

BY HIS ATTORNEYS
Spensley & Horn.

June 11, 1968 G. L. CANN 3,388,291
ANNULAR MAGNETIC HALL CURRENT ACCELERATOR
Filed Aug. 31, 1964 3 Sheets-Sheet 3

GORDON L. CANN,
INVENTOR.
By His Attorneys.
Spensley & Horn.

United States Patent Office 3,388,291
Patented June 11, 1968

3,388,291
ANNULAR MAGNETIC HALL CURRENT
ACCELERATOR
Gordon L. Cann, Laguna Beach, Calif., assignor to
Electro-Optical Systems, Inc., Pasadena, Calif., a
corporation of California
Filed Aug. 31, 1964, Ser. No. 393,288
7 Claims. (Cl. 315—111)

ABSTRACT OF THE DISCLOSURE

Hall current generator apparatus for electromagnetically accelerating and confining an ionized gas plasma. An annular field coil concentrically surrounds an arc jet apparatus to create an axisymmetric magnetic field radially expanding in the downstream direction, the relationship between gas pressure and magnetic field strength being such that the magnetic field interactions predominate over dynamic forces to provide an axially extending tubular sheath of current concentrically surrounding a plasma cylinder, the magnetic field diverging out of the current density to create axial accelerating forces and radially inwardly directed plasma confining forces.

Cross-references to related applications

This application is directed toward improvements in the Hall current generator apparatus disclosed and claimed in copending U.S. patent application Ser. No. 217,631, entitled "Plasma Accelerator Using Hall Currents," now U.S. Patent No. 3,243,954, issued Apr. 5, 1966, together with a subsequently filed continuation in part, copending U.S. patent application Ser. No. 394,383, entitled "Plasma Accelerator Using Hall Currents," now U.S. Patent No. 3,309,873.

Background of the invention

(1) FIELD OF THE INVENTION

Plasma generating and accelerating devices in which an ionized gas plasma is accelerated to high velocities are recognized by science to possess great potential in certain applications. A particular application in which such devices could be of particular importance is in the field of space propulsion. The thrust of a space propulsion system is dependent upon the product of the propellant mass flow rate and the exhaust velocity relative to the vehicle. The current use of chemical rocket fuels entails a limitation on space flights because the propellant exit velocities are relatively low and large masses of propellant must be carried aloft. Considerable thought has been given to the use of an ionized gas plasma in space propulsion systems with a view toward increasing the exhaust velocity of the propellant, together with a substantial reduction in propellant weight and space requirements as compared with chemical propellants.

(2) DESCRIPTION OF THE PRIOR ART

The standard prior art method for accelerating an ionized gas plasma to high velocities is to pass the plasma through a crossed field channel accelerator in which electric and magnetic fields are maintained at right angles to each other and transverse to the "channel" into which the ionized gas is longitudinally injected. It is known that an electric field transfers energy to charged particles and that a magnetic field exerts a force on charged particles in motion relative to the magnetic field. When a magnetic field is established at right angles to a moving stream of electrically conductive fluid, an electric field is induced perpendicular to both the stream direction and the field lines. If an electric field is now applied in the same direction as the induced electric field, but stronger than the induced electric field, then a current flows in the conductive fluid in the direction of the applied electric field, which current interacts with the magnetic field to produce a force which is in the direction of the moving stream. In accordance with commonly used vector notations, the net current density is denoted by "$j$" and the magnetic flux density denoted by B. Hence, the crossed-field channel accelerator is also known in the art as a "$j \times B$" channel accelerator.

However, in a $j \times B$ channel accelerator, the electrical current does not necessarily flow perpendicular to the electrodes, but can flow at some angle due to the phenomenon known as Hall effect. When the Hall potential is zero, the net resultant current is the combination of the "ordinary" currents and the Hall currents. Because of the angularity of the net resultant current flow between the electrodes, a force is applied to the gas stream deflecting the flow in the direction of the applied electric field, the angle of deflection changing with variations in gas pressure and in the strength of the applied magnetic field. Thus acceleration of a plasma jet in accordance with this type of prior art practice results in deflection as well as spreading of the jet, these characteristics being undesirable for use of the jet as a space propulsor because maximum thrust is obtainable only from a sharply focused jet containing no angular velocity components. Also, in the prior art $j \times B$ channel accelerators, energy is initially transferred from the electric field to the electrons and must then be transferred by collisions to the heavier particles. Due to the slow rate of energy transfer between electrons and heavy particles by elastic collisions, the electrons usually are heated until they can collide inelastically and ionize the atoms, thereby transferring a large fraction of the input electrical energy into a form of potential energy that is not easily recoverable. There is also a very high heat flux into the electrodes, causing them to erode at a relatively high rate.

In order to obviate the aforementioned disadvantages of the $j \times B$ prior art accelerator, the present inventor developed plasma accelerators utilizing Hall currents to provide the axial accelerating force, these accelerators being disclosed in the above referenced copending patent applications. In these disclosed Hall current accelerators an ionized gas plasma is accelerated without causing deceleration or spreading of the jet while maintaining the electrodes at a relatively low temperature, the joule heating of the gas being converted into axial jet energy in the same region where the acceleration occurs. The spiraling forces of the ordinary currents are minimized and the Hall currents utilized to provide an axial accelerating force. In the aforementioned patent application, as well as in the present sepcification, the term "Hall currents" is utilized in its broadest sense. The so-called "ordinary" currents flow in the direction of the electric field, these currents flowing in the presence of an E.M.F. However, a current flow can be obtained in a direction where the electric field is zero, and this type of current flow can be produced by two different kinds of mechanisms: (1) By current density crossing a magnetic field ($j \times B$), and (2) By a velocity component crossing a magnetic field ($V \times B$). The use of the term "Hall currents" in its broadest sense includes both of the mechanisms.

Summary of the invention

Although the operation of the plasma generators of my aforementioned patent application is predicated upon the generation of axial forces through the use of tangential Hall currents induced by passing the gas through electric and magnetic fields in which the magnetic field lines are divergent as they cross axial current density lines, it was believed throughout the development these Hall current generators that in order to obtain the current density lines in the desired axial and downstream direction it was necessary to literally force the current to flow in this direction by establishing a physical geometry wherein the plasma would pass through an elongated tube throughout which extended an axial electric field so that the applied current would flow in an axial direction through the plasma. It was believed that the tube walls were needed for the dual purpose of confining the discharge to an axial path and to establish the axial electric field, the axial electric field being created by connecting a source of electric potential across the opposite ends of the tube. However, the present inventor has discovered through further experimentation, as will be explained hereinbelow, that it is the applied magnetic field and not the tube walls and axial electric field which controls the position of the discharge, and that the discharge has no apreciable effect on the magnetic field at low currents, i.e., currents below about 1000 amperes. Thus, it is not necessary to utilize tube walls to force an axial discharge. Upon obtaining these totally unexpected results, the present invention plasma accelerators were developed upon the concept that the desired axially extending discharge could be formed by establishing a magnetic field configuration in which the magnetic field lines diverge out of the current density. Through utilization of this concept the present invention Hall current generator structures provide a significant advancement in the Hall current plasma accelerator art by eliminating the necessity of a preionizing electrical discharge and providing greatly simplified and less expensive structures which are very much easier to fabricate. Furthermore, the exhaust jet is electromagnetically confined to collimate the jet to achieve high thrust efficiency.

Accordingly, it is an object of the present invention to provide improved plasma accelerators.

It is also an object of the present invention to provide improved plasma accelerators of the type utilizing Hall currents for the main axial accelerating force.

It is another object of the present invention to provide greatly simplified Hall current accelerator structures.

It is a further object of the present invention to provide improved Hall current accelerators which do not use physical structures for plasma containment.

It is yet another object of the present invention to provide improved Hall current accelerators using stable magnetic confinement of the exhaust plasma jet.

It is a still further object of the present invention to provide improved Hall current accelerators having magnetic control over arc configuration, thereby allowing thrust vector control.

It is also an object of the present invention to provide improved Hall current accelerators in which a preionizing electrical discharge is unnecessary.

It is another object of the present invention to provide improved Hall current accelerators useful as electromagnetic thrust devices capable of operating at very high specific impulse.

It is a further object of the present invention to provide improved Hall current accelerators wherein the electrodes do not have to carry extremely large currents when operating at very high specific impulse.

It is yet another object of the present invention to provide novel techniques for utlizing Hall currents in both plasma accelerators and generators.

The objects of the present invention are accomplished by a plasma accelerator configuration comprising a single cylindrical discharge wherein axially symmetric current density lines extending downstream between an anode and a cathode cross magnetic field-lines which are divergent in the downstream direction, i.e., the magnetic field lines diverge out of the current density. The relationship between gas pressure and magnetic field strength is such that the magnetic field interactions predominate over the gas dynamic forces and the current density path is determined by magnetic field configuration. In a presently preferred embodiment a point cathode is concentrically disposed with respect to a ring anode, the cathode and anode being positioned in a region where a magnetic field is high and the gas pressure low enough to obtain a strong electromagnetic interaction. Advantage is taken of the high ionizing capability of the arc itself, thereby eliminating the necessity of a preionizing arc. A surface ionization principle is utilized, the jet comprising a central core extending axially downstream from the point cathode and surrounded by a tubular sheath of current extending from the sharp circular edge surface of the ring anode. The current from anode to cathode travels down the tubular sheath to a point downstream in the jet and then back through the central core to the cathode. Tangential Hall currents are induced in the tubular sheath due to the current crossing the diverging magnetic field lines, these Hall currents interacting with the magnetic field to produce axial thrust and radial compression of the jet. It is believed that the current in the central core is carried by high velocity electrons and additional axial forces are generated in this region by a self-magnetic pumping effect.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

*Description of the preferred embodiments*

Figure 1:
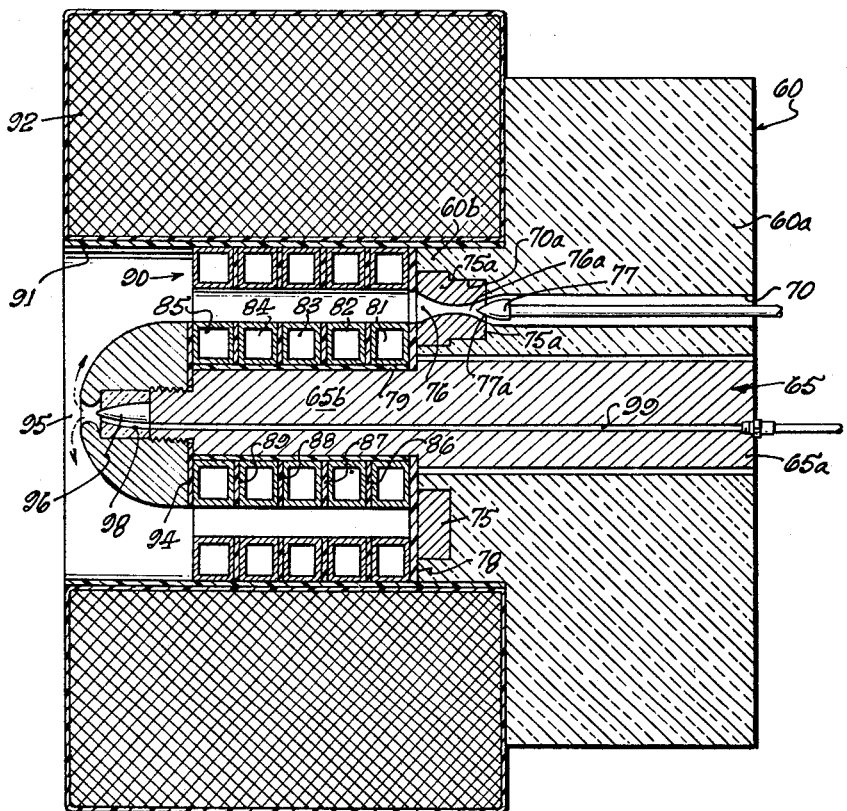
FIGURE 1 is an elevation view, in section, of an earlier embodiment of a plasma accelerator from which the present invention device was evolved.

As stated hereinabove, it was formerly believed that in order to obtain current density lines in an axial and downstream direction it was necessary to literally force the current to flow in this direction by establishing a physical geometry wherein the plasma would pass through an elongate tube throughout which extended an axial electric field. Hall current accelerator embodiments of this type are disclosed in my aforementioned copending patent application and FIGURES 5 and 6 of this copending application are reproduced for reference purposes as FIGURES 1 and 2 of the present drawing Turning now to FIGURES 1 and 2 of the drawing an earlier plasma accelerator embodiment utilizing a central core body to prevent concentration of the plasma current into a filament along the central axis of the channel is illustrated. In this embodiment the gas is confined in an annular channel through which an electric sheet discharge is maintained in an axial direction.

The various accelerator components are mounted to an archead support structure 60, of generally annular configuration and fabricated from a suitable electrical insulating material, such as Micarta. The support structure 60 includes a larger diameter annular portion 60a contiguous with a smaller diameter annular portion 60b. A cylindrical core 65, of iron or other suitable metal, is fitted into the central aperture of the archead support structure 60 and projects therefrom. The cylindrical core 65 comprises a larger diameter portion 65a fitted into the central aperture of the archead support structure and coextensive therewith, and a smaller diameter portion 65b projecting from the archead support structure. The archead support structure, the cylindrical core, and certain of the hereinbelow described components are provided with numerous orifices and passageways for the flow of coolant fluids. However, since suitable methods and techniques for cooling plasma generator structures are well known in the art, in the interest of clarity such orifices and passageways are not shown in the drawings.

Figure 2:
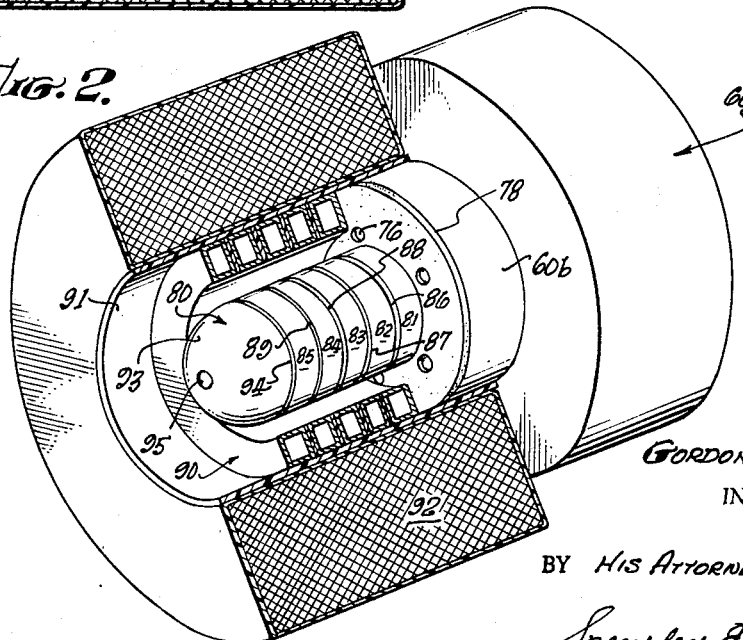
FIGURE 2 is a partial perspective view, partially in section, of the embodiment of FIGURE 1.

Extending axially through the archead support structure 60 are a plurality of circumferentially spaced openings 70, five of such openings being used in the illustrated embodiment of FIGURES 1 and 2. Each of the openings 70 terminates in an enlarged end portion 70a at the projecting end of the annular portion 60b of the archead support structure.

An annular anode plate 75, of varying thickness is mounted to the end of the projecting smaller diameter annular portion 60b of the archead support structure. The anode plate 75 is fabricated of metal, preferably copper, and is provided with a series of five circumferentially spaced cylindrical projections 75a, each of the cylindrical projections 75a mating with one of the enlarged end portions 70a in the archead support structure. The anode plate is provided with a series of five passageways 76, each of the passageways 76 extending coaxially through a different one of the cylindrical projections 75a. The openings 76 are tapered to form a sonic orifice 76a terminating in a supersonic nozzle 76b.

Mounted within each of the openings 70 is a cylindrical cathode 77 fabricated of a suitable metal, with tungsten being presently preferred. Each of the cathodes 77 defines a tapered end portion 77a projecting partially into the adjacent sonic orifice and in coaxial alignment therewith. Each of the cathodes 77 is energized by a separate power supply (not shown) connected between it and the anode plate 75.

The open volume defined between the tapered end portion 77a of each of the cathodes 77 and the tapered surfaces of the anode plate 75 defining the sonic orifices 76a forms a gas chamber. Plasma is produced within each of the gas chambers by pumping gas under pressure through suitable gas inlet passageways, not shown, in the archead support structure 60 and into each gas chamber, and through an arc maintained between the cathode 77 and the anode plate 75, the plasma then passing through the sonic orifices 76a and then being expanded in the contiguous supersonic nozzles 76b. Thus, five circumferentially spaced arc gap devices are provided within the archead support structure 60, each arc gap device being electrically energized by a separate power supply.

An annular, multi-segment, inner cooling jacket, generally indicated by the reference numeral 80, is fitted onto the projecting smaller diameter portion 65b of the cylindrical core 65. An insulating ring 78 is abutted against the shoulder defined by the projecting end surface of the larger diameter portion 65a of the cylindrical core and an insulating sleeve is coaxially mounted on the projecting smaller diameter portion 65b of the cylindrical core. Thus the inner cooling jacket 80 is insulated from the metallic core 65. The inner cooling jacket is comprised of a plurality of annular jacket segments, each segment being insulated from the adjoining segment by an insulating ring. Five such jacket segments are shown in the illustrating embodiment of FIGURES 1 and 2, the jackets being identified by the reference numerals 81–85. Each of the jacket segments 81–85 is a hollow, metallic annulus provided with a wall extending transversely across its interior space; by providing an inlet and an outlet on either side of the transverse wall and adjacent thereto a substantially circular flow of coolant can be established within each jacket segment. The inlets and outlets of the various jacket segments 81–85 are coupled to suitable manifolds, not shown, and thence through passageways extending through the archead support structure for coupling to a source of coolant under pressure. The jacket segment 81 is abutted against the insulating ring 78, the insulating ring 78 being provided with suitable openings coextensive with the supersonic nozzles defined in the anode plate. The jacket segment 81 is insulated from the adjacent jacket segment 82 by an insulating ring 86, similar insulating rings 87–89 separating the remaining jacket segments from each other.

An outer cooling jacket, generally indicated by the reference numeral 90, and similar in construction to the inner cooling jacket 80 but of larger diameter, is secured to the projecting end of the annular portion 60b of the archead support structure and abutted against the insulating ring 78. The outermost diameter of the cooling jacket 90 is substantially equal to the outer diameter of the annular portion 60b. The space between the inner surface of the cooling jacket 90 and the outer surface of the cooling jacket 80 defines an annular shaped accelerator channel. Thus, the five hereinabove described supersonic expansion nozzles empty directly into the accelerator channel. An insulating sleeve 91 is coaxially mounted onto the outer cooling jacket 90 and the smaller diameter annular portion 60b of the archead support structure. An annular magnetic field coil assembly 92 is coaxially disposed on the insulating sleeve 91 and abutted against the larger diameter annular portion 60a of the archead support structure.

The smaller diameter portion 65b of the cylindrical core 65 terminates in a threaded end portion 65c, into which is threaded a tapered cylindrical metallic afterbody 93, the afterbody 93 being generally toroidally shaped and having a flat end surface which is abutted against an insulating ring 94 disposed against the jacket segment 85 of the inner cooling jacket. The hollowed out central portion of the afterbody 93 is partially threaded adjacent its flat end surface so that the afterbody may be screwed onto the threaded portion 65c of the cylindrical core, the remaining portion of the inner surfaces of the afterbody defining a cylindrical opening terminating in an arcuate, generally toroidally shaped orifice 95. Within this central portion and adjacent the orifice 95 is disposed a tapered conical cathode 96, the cathode 96 being mounted to the projecting end of the threaded portion 65c of the cylindrical core. The cathode 96 is fabricated of tungsten or other suitable metal and is surrounded by an insulating plug 97 of a suitable buffering material, such as boron nitride. A passageway 98, as shown in FIGURE 1, extends through the buffering plug and communicates with a gas inlet passageway 99 extending longitudinally through the cylindrical core 65, the passageways 98 and 99 being for the purpose of injecting gas into the orifice 95. A suitable power supply is connected between the cathode 96 and the anode plate 75.

In the operation of the embodiment shown in FIGURES 1 and 2 a total of five arc jets are utilized to heat and partially ionize a gas flow which is then passed through the sonic orifices 76a, expanded in the adjacent supersonic nozzles 76b, and then passed through the annular shaped accelerator channel. A sheet electric discharge is maintained along the length of the accelerator channel by striking a discharge from the point of the cathode 96 at the orifice 95 to the exposed portions defining the supersonic expansion nozzles in the anode plate 75. The cross-sectional area of the accelerating channel can be changed by alteration of the outer diameters of the cooling jacket 90 and the afterbody 93, or by altering the innermost diameter of the cooling jacket 80, or both.

The accelerating discharge extending from the cathode 96 to the exposed portions of the anode plate 75 is in the form of a sheet due to the tapered toroidally shaped surface of the afterbody 93 and the circumferentially spaced anode portions. The injection of a small amount of gas over the buffered cone shaped cathode 96 causes operation of the cathode 96 in a highly confined spot mode of emission (similar to the operation of the archead jet cathodes) whereby the second cathode is capable of carrying currents up to about 2,500 amperes with a negligible amount of erosion or burn-off, this type of operation not being possible with the usual distributed thermionic type of emission. The injection of the cold gas on the surfaces of the afterbody tip 93 defining the orifice 95 pushes the sheet discharge away from the afterbody surface, as indicated by the dotted line arrows shown in FIGURE 1.

Insulation of each of the jacket segments of the inner and outer cooling jackets allows the establishment of the desired axial electric field along the channel as well as providing wall confinement of the plasma. Hall currents result from the spiraling of the electrons about the central core body formed by the inner cooling jacket 80 and the afterbody 93. These Hall currents interact with the radial component of the magnetic field to provide axial accelerating forces. In the design of this embodiment it was expected that this Hall current effect would provide the major axial accelerating force. However, there are three other accelerating mechanisms acting upon the plasma passing through the accelerator structure of FIGURES 1 and 2. The current density of the secondary electrical discharge extending out of the orifice 95 in the afterbody tip causes acceleration of the gas, thereby providing a self-magnetic pumping effect. Also, expansion of the gas over the afterbody tip at the channel exit converts internal energy into directed kinetic energy. Finally, the (negative) radial component of current of the second electrical discharge interacts with the axial component of the applied magnetic field to induce tangential Hall currents in the region of expanding current at the channel exit. These rotating Hall currents interact with the radial component of the applied magnetic field to accelerate the gas in the positive axial direction (through the channel outlet). This last mentioned accelerating mechanism was found to provide the greatest accelerating force on the plasma. The embodiment of FIGURES 1 and 2 is a practical embodiment and typical operating conditions for this embodiment are described in the aforementioned copending patent application.

Figure 3:
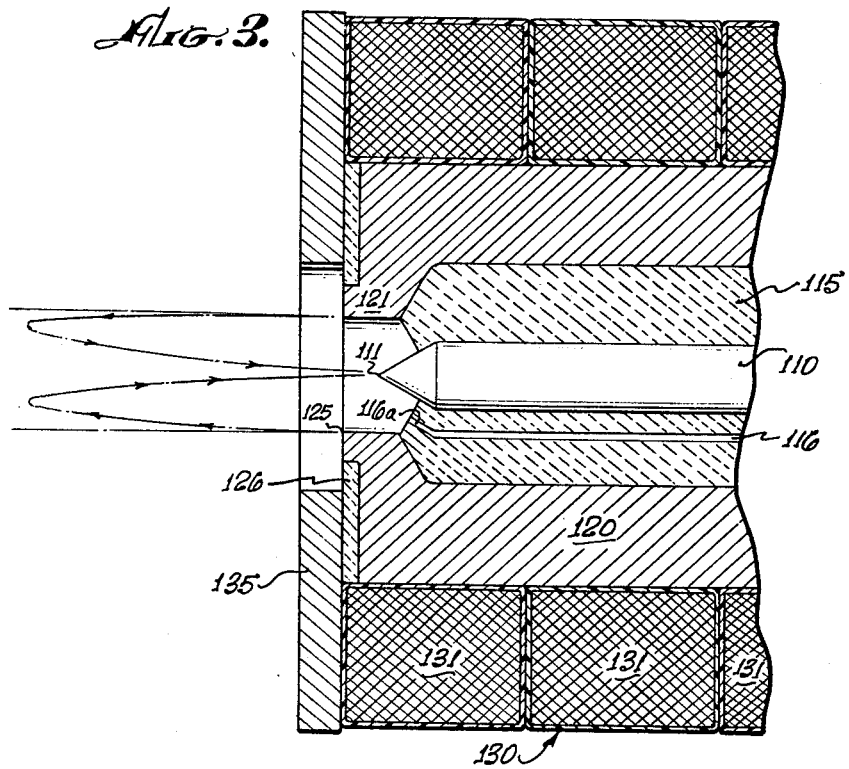
FIGURE 3 is a partial elevation view, in section, of a presently preferred embodiment of the present invention device.
Figure 4:
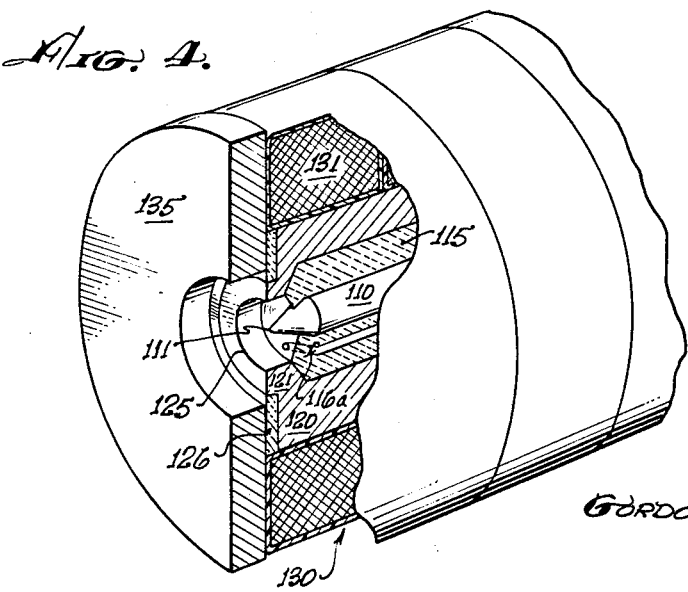
FIGURE 4 is a perspective view, partially cut away, of the embodiment of FIGURE 3; and, FIGURE 5 is a perspective view, partially cut away, of another embodiment of the present invention device, and including a pictorial representation of the plasma magnetic field interaction.

Although satisfactory operation was obtained from the embodiment of FIGURES 1 and 2, considerable heat and friction losses along the length of the channel were noted. Consequently, further experiments were conducted in an attempt to determine if the accelerator channel could be eliminated while still maintaining the desired axial jet configuration. Accordingly, the assembly containing the arc jets and anode plate was removed and replaced by a cylindrical anode, the front face of which coincided approximately with the cathode tip. As expected, device operation improved, due to the decreased friction and heat losses. However, contrary to all expectations, device operation with an axially extending jet was still maintained with the anode plate moved right up to the second cathode. And, ionization was obtained by an additional and different mechanism, namely, by surface ionization due to electric field concentration at sharp surfaces. Further mathematical analysis was then conducted and new design principles formulated, which resulted in the present invention embodiment as shown in FIGURES 3 and 4. The configuration of FIGURES 3 and 4 is somewhat like an arc jet having a solenoidal magnetic field coil placed around the generator.

Although the physical structure of the embodiment shown in FIGURES 3 and 4 appears to be basically an arc jet device with a surrounding magnetic field, the mode of operation of the device is entirely different from that of the common plasma torch. In the well-known plasma torch there is volume ionization of the gas and the path of the plasma is determined by gas dynamic forces. In the present invention device, on the other hand, neither of these factors occur. Instead of volume ionization of the gas, in the present invention device ionization occurs at the electrode surfaces. The sheets of ionization carry the current and the plasma path is determined by magnetic field configuration. This is achieved by using such low ambient pressures that the magnetic field interactions predominate over the gas dynamic forces. The parameter that describes this relationship is disclosed in my aforementioned copending patent application and is called $\omega\tau$ where $\omega$ is the particle cyclotron frequency and $\tau$ is the particle mean collision time. In order for the magnetic field configuration to achieve control $\omega\tau$ must be greater than unity for the electrons, with frequency in cycles per second and time in seconds. In practice, best device operation is achieved with $\omega\tau$ for electrons very much greater than unity and with $\omega\tau$ for the ions less than unity. It has been found that device performance seriously degrades when $\omega\tau$ for the ions is in excess of unity. In the following illustrated embodiment of the present invention device charged particles are produced at the sharp electrode surfaces and the current follows the path of the charged particles, this path being determined by the magnetic field configuration. Thus, the present invention technique simplifies Hall current generators and accelerators to a basic region for the production of plasma and a conduction cylinder of plasma interacting with an axisymmetric diverging magnetic field to axially accelerate the gas while simultaneously magnetically confining it.

Turning now to FIGURES 3 and 4 of the drawing, the central axis of the device is defined by a cylindrical cathode rod 110 having a conically tapered end portion terminating in a pointed tip 111. The cathode 110 is fabricated from an electrically conductive but nonmagnetic material so that it will not influence the magnetic field, with tungsten being presently preferred. The cathode rod 110 is tightly surrounded by a cylindrical tube 115 of suitable electrical insulating material, such as boron nitride for example. The insulating tube 115 defines an axially extending gas inlet passageway 116 terminating near the cathode tip in an oblique portion 116a in order to impart a swirling motion to fluid passing therethrough and ejected across the cathode tip.

Tightly encircling the insulating tube 115, and projecting slightly therebeyond, is a tubular cylindrical anode 120 of tungsten or other suitable electroconductive, nonmagnetic material. The tubular anode 120 has a reduced diameter end portion. The innermost surface of the reduced diameter end portion 121 defines a tubular surface extending from the end of the insulating tube 115 to the projecting end surface of the anode. The junction between this tubular surface and the projecting end surface of the anode defines a sharp circular edge 125. Recessed into the projecting end surface of the tubular anode 120 is an annular ring 126 fabricated of boron nitride or other suitable electrical insulating material.

An annular magnetic field coil assembly 130, comprising a series of field coils 131 which are electrically insulated from each other and from the anode 120, is coaxially disposed on the tubular anode 120. An annular plate 135, fabricated of iron or other suitable magnetic material, is concentrically mounted in abutting relationship with the annular insulating ring 126, the innermost diameter of the annular plate 135 being larger than the innermost diameter of the insulating plate 126 so that the insulating plate 126 both physically and electrically insulates the plate 135 from the anode 120.

In operation of the embodiment of FIGURES 3 and 4, a strong direct current is fed to the field coil 131 from a source of electrical power, not shown, to thereby establish the desired magnetic field. As stated hereinabove it is required that the magnetic field lines diverge out of the current density. This is readily accomplished through the use of annular coil windings and the iron end plate 135 which causes the external magnetic field to be predominately axial in the region extending between the cathode tip 111 and the sharp anode edge surface 125, the magnetic field expanding radially downstream of the end plate 135 and finally reversing in direction to form the familiar magnetic flux loop.

The propellant, which is preferably a readily ionizable gas, although it can be any material which can be vaporized at practical temperatures, say up to about 2,000° K., is then pumped under pressure through the inlet passageway 116 and ejected across the pointed cathode tip. Upon establishing a steady propellant flow a suitable electric potential is applied between the cathode and the anode. This electric potential is preferably derived from a constant-current D.C. power supply which produces suitable voltage to cause an arc to be struck between the sharp anode edge 125 and the pointed cathode tip 111. The magnetic field causes distortion of the arc so that the arc, instead of extending directly between the cathode and the anode, forms an elongated loop extending downstream from the electrodes. An expanding cone of current extends downstream from the cathode tip and a tubular sheath of current extends downstream from the circular edge surface 125 of the anode, as indicated by the dotted portions in FIGURE 3. The inner cone of current meets and merges with the tubular outer sheath of current downstream of the device and the current flows along the outer sheath and then back through the central core, as indicated by the multi-arrowed lines in FIGURE 3 of the drawing. Charged particles are produced at the sharp anode circular edge surface 125 and the pointed cathode tip 111 because of the electric field concentration at these sharp surfaces. The space between the inner cone of current and the outer sheath of current, in the vicinity of the electrodes and downstream therefrom to the point where the current loop is completed, is filled with un-ionized gas. Downstream of the point at which the current loop is completed the plasma extends axially therefrom as a uniform cylindrical plasma jet. This jet of plasma results from the merger of the outer sheath of current with the inner cone of current, the merger being caused by the outward diffusion of charged particles in the inner cone of current and the inward diffusion of charged particles in the outer sheath of current. Although it is clear that surface ionization occurs at the sharp electrode edge surfaces, it is also believed that ionization occurs in the outer cylindrical current sheet, due to collisions involving high energy electrons.

It has been found that the relative electrode positioning is not critical as long as axial symmetry is maintained. In fact, the cathode may even be positioned downstream of the anode. Both the cathode and the anode should define fairly sharp surface portions to give the field concentration for production of the charged particles.

The diameter of the ring anode is not critical, although the larger the diameter the more magnetic field lines which will be crossed, and the greater the thrust obtained. However, a practical limitation on the ring anode diameter is determined by the magnetic field strength which can be achieved with reasonable power supply limitations. It is presently preferred to utilize a constant-current power supply since this type of power supply will provide a high voltage necessary to initiate the arc and a current at a lower voltage to sustain the arc. The size of the electrodes is determined by the desired power handling capabilities.

The device of FIGURES 3 and 4 is capable of efficient operation over an extremely wide power range. At the present state of development, the embodiment of FIGURES 3 and 4 is practical for operation at power levels as low as about 50 watts and up to and in excess of 100 megawatts. As a practical example of the operation of this embodiment, a device was operated at a 150 kilowatt power level with a load voltage of about 110 volts, an arc current of about 1,400 amperes, and at an ambient pressure of about 1 mm. Hg. With these operating parameters an exhaust velocity from about 30 kilometers per second to about 80 kilometers per second was obtained with an electromagnetic coil current of about 2,000 amperes. This represents a thrust efficiency of from 30 to 50 percent.

Another device of the embodiment of FIGURES 3 and 4 has been operated with comparable thrust efficiencies at lower power ratings, on the order of 2 kilowatts with an operating pressure on the order of about 50 microns. Typical parameters are an operating voltage under load of 50 volts, and an arc current of about 40 amps.

The ambient pressure must be low enough to insure that the magnetic field interactions will predominate over gas dynamic forces, as explained hereinabove. This condition is most readily achieved in practice by control of the ratio between magnetic field strength and ambient pressure, and by utilizing sufficient spacing between the cathode and the anode to insure against a pressure build-up due to a restriction of gas flow. At the present state of the art, it is more practical to achieve lower pressures than it is to achieve higher magnetic field strengths. Although extremely high magnetic field strengths are now obtainable in apparatus recently developed through the use of advanced electromagnetic techniques, the size, weight and costs of such apparatus render it more feasible to utilize lower ambient pressures rather than higher magnetic field strengths. Also, in the upper atmosphere and outer space, the ambient pressures are very low, thereby enabling the convenient use of conventional magnetic field coil and power supply assemblies.

Figure 5:
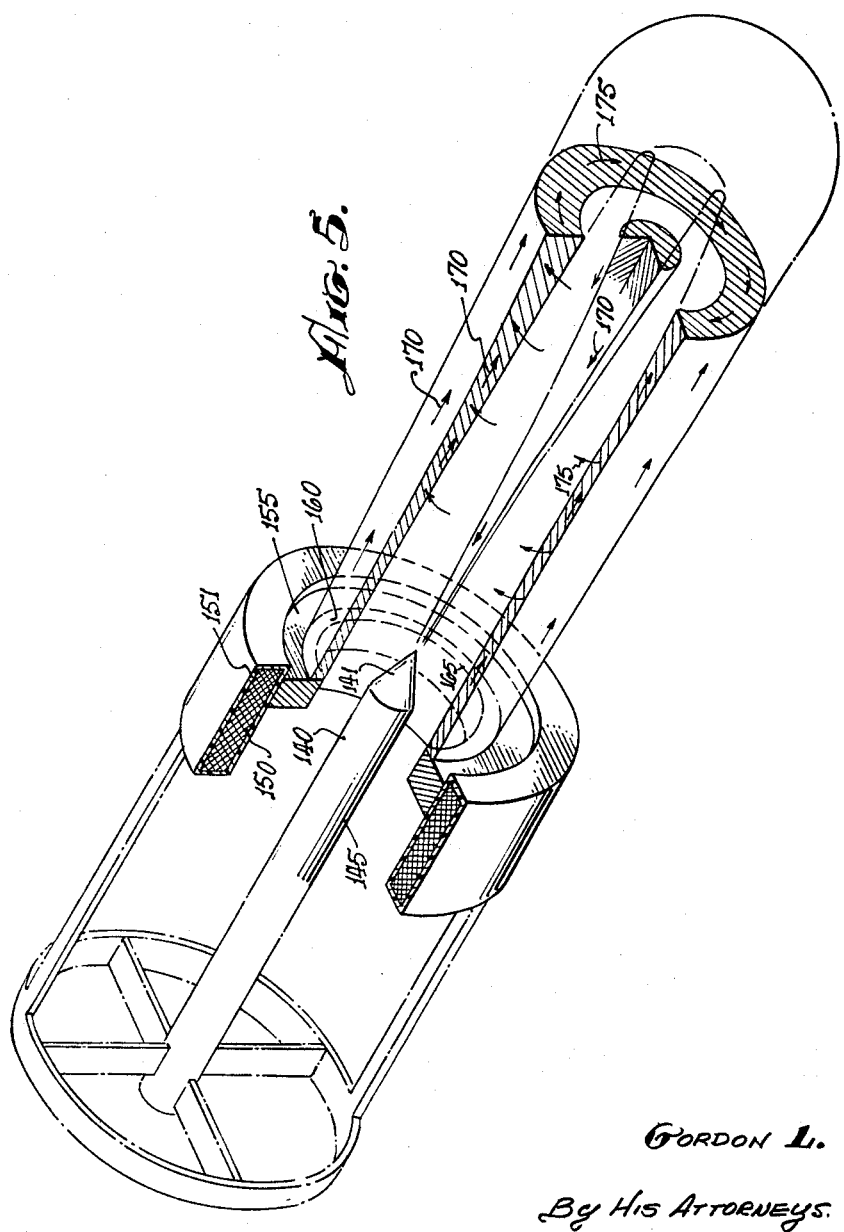

Further considerations of the use of the embodiment of FIGURES 3 and 4 in outer space led to the development of the simplified embodiment of FIGURE 5 of the drawing. In the embodiment of FIGURE 5 the central axis of the device is defined by a cylindrical cathode rod 140 having a conically tapered end portion terminating in a pointed tip 141. The cathode 140 is fabricated from an electrically conductive but nonmagnetic material so that it will not influence the magnetic field, with tungsten being presently preferred The cathode rod 110 is mounted to a suitable support structure, such as a circular spider suggested in the drawing The support structure should be of an open type of construction to allow the free circulation and passage of the ambient atmosphere through the device.

An annular magnetic field coil 150 is supported in concentric alignment with the cathode rod 140, the coil 150 being encased in a sheath of electrical insulating material generally indicated by the reference numeral 151. Concentrically mounted within the field coil 150 is an annular ring anode 160. The ring anode 160 is formed of tungsten or other suitable electroconductive, nonmagnetic material, the anode ring defining a sharp circumferential circular edge surface 165. The magnetic field coil and electrode placement of the embodiment of FIGURE 5 is similar to that of the embodiment of FIGURES 3 and 4 of the drawing. However, an important difference between these two embodiments is the open type of construction utilized in the embodiment of FIGURE 5, which allows free circulation of the ambient atmosphere through the device, as contrasted to the closed type of construction of the embodiment of FIGURES 3 and 4 wherein free circulation of the ambient atmosphere is prevented in order to provide for the controlled injection of confined propellant across the cathode tip.

The purpose of the open type of construction of the embodiment of FIGURE 5 is to utilize the ambient atmosphere as the device propellant, thereby rendering unnecessary the confinement and transportation of propellant. Elimination of the requirement of a self-contained propellant is a significant advancement in the art of space propulsion systems since it entails a drastic and important reduction in system weight and space requirements, as well as enabling flights of almost unlimited distance.

The extremely low ambient pressure encountered in outer space provides an ideal operating environment for Hall current accelerators utilizing the present invention concepts since gas dynamic effects are rendered virtually insignificant with respect to magnetic field effects. In the open type construction embodiment of FIGURE 5 the magnetic field lines are free to capture charged particles in the ambient atmosphere. The captured charged particles spiral in along the magnetic field lines and pass between the anode and cathode and into the accelerating discharge. The use of this concept as a propulsive device is somewhat analogous to the operation of a ram jet, and the present invention device might be termed a space-electric ram jet.

There are two electromagnetic accelerating mechanisms and an electromagnetic confining mechanism acting upon the plasma passing through the accelerator structures of FIGURES 3, 4 and 5. Frist, tangential Hall currents are generated by the applied current crossing the magnetic field lines, the rotating Hall currents interacting with the radial component of the applied magnetic field to provide an axial accelerating force.

The second accelerating mechanism is provided by an axial force resulting from a so-called self-magnetic pumping effect. Radially inwardly directed components of the applied current interact with the self-magnetic field induced from this current, this self-magnetic field being a tangential magnetic field. Axial downstream forces result from these tangential magnetic field lines crossing the convergent current density vector lines. The accelerating forces provided by this self-magnetic pumping effect provides about from 5 to 10% of the total thrust of the present invention devices.

Magnetic confinement of the plasma, downstream of the electrodes, is provided by interaction of the tangential Hall currents with the axial component of the magnetic field, this reaction providing radially inwardly directed confining forces. Referring specifically to FIGURE 5 of the drawing, there is shown a pictorial representation of the zone of plasma magnetic field interaction. This pictorial representation is partially cut away, however the inner cone of current and the outer sheath of current are readily apparent. The series of axially directed arrows 170, pointing axially downstream within the outer sheath of current and axially upstream within the inner cone of current, represent the flow of applied axial current. The series of arrows 175, pointing in a clockwise direction within the outer sheath of current, represent the induced tangential Hall currents for a given magnetic field direction. Reversal of the magnetic field direction will cause reversal of the direction of rotation of the tangential Hall currents, but will still result in axial thrust. The operation of the hereinabove described electromagnetic interactions will become apparent upon consideration of this pictorial representation.

In the outer sheath of current, the axial current flow in the downstream direction crosses the expanding magnetic field lines to cause generation of the tangential Hall currents which result in the development of axial accelerating forces in accordance with the aforementioned first accelerating mechanism. The current return path (the axial current flow in the upstream direction in the central cone of current) closely follows the magnetic field lines and so there is not significant generation of Hall current decelerating forces. However, there are axial accelerating forces developed by the current return path in the central cone of current, these accelerating forces being due to the self-magnetic pumping effect of the aforementioned second accelerating mechanism.

Thus there have been described novel plasma accelerator concepts and embodiments in which Hall currents are utilized for the development of axial thrust, based upon the discovery that the plasma path can be determined by magnetic field interactions rather than by gas dynamic forces, by maintaining the product of the particle cyclotron frequency and the particle mean collision time greater than unity for the electrons in the plasma. Since Hall current accelerating forces produce thrust in the direction of current lines, utilization of this magnetic control principle provides a simple technique whereby an applied magnetic field can be utilized for the multiple purposes of generating Hall currents, for maintaining a desirable axially downstream current flow in the plasma jet, and for providing plasma confining forces. Advantage can be taken of the high ionizing capability of the accelerating discharge, thereby eliminating the necessity for preionizing arcs. Thus, under the aforementioned conditions a Hall current plasma accelerator can be reduced to the simple structure of an arc jet apparatus concentrically disposed within an annular magnetic field coil, the magnetic field being strong and axial in the arc region and downstream therefrom being divergent with respect to the axis whereby axisymmetric current density lines cross the magnetic field lines in the proper direction to produce axial accelerating forces and radially inwardly directed confining forces.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. Steady-state apparatus for accelerating and magnetically confining a plasma in a predetermined direction along a predetermined axis comprising, in combination:
   (a) means for establishing a plasma jet "downstream of all structural components" defining a region wherein axial current flows in said predetermined direction and symmetrical with respect to said predetermined axis; and
   (b) means for maintaining a predetermined magnetic field symmetrical with respect to said predetermined axis and expanding in said predetermined direction through said region of axial current flow to define strong magnetic field lines crossing axial current density lines and divergent with respect thereto, the ratio of the field strength of said magnetic field to the ambient pressure in said region of axial current flow being sufficient to maintain the product of the particle cyclotron frequency in cycles and the particle mean collision time in seconds greater than unity for the electrons in said plasma jet.

2. Steady-state apparatus for generating accelerating and magnetically confining a plasma in a predetermined direction along a predetermined axis comprising, in combination:
   (a) a conically pointed cathode electrode disposed on said predetermined axis and pointed in said predetermined direction;
   (b) a ring anode concentrically disposed on said predetermined axis;
   (c) a source of direct current connected between said cathode electrode and said anode electrode to maintain an electric arc discharge therebetween;
   (d) means for introducing a stream of ionizable fluid into the space between said cathode and anode electrodes to create a cylindrical plasma arc;
   (e) an annular field coil concentrically disposed about said cathode and anode eletrodes, said field coil being so disposed and wound that the magnetic field created upon electrical energization thereof will extend through said plasma symmetrically about said predetermined axis and expanding in said predetermined direction to define strong magnetic field lines crossing axial current density lines and divergent with respect thereto; and
   (f) means for electrically energizing said field coil to create a magnetic field of sufficient strength so that the ratio of the field strength of said magnetic field to the ambient pressure in the region of said plasma jet is sufficient to maintain the product of the particle cyclotron frequency in cycles and the particle mean collision time in seconds greater than unity for the electrons in said plasma jet.

3. Steady-state apparatus for accelerating and magnetically confining a cylindrical plasma in a predetermined direction along a concentric axis comprising means for establishing an electric discharge forming an axially extending tubular sheath of direct current downstream of all structural components of said apparatus and concentrically surrounding said plasma cylinder and defining current density lines extending axially in said predetermined direction, said means including means for maintaining a magnetic field extending through said plasma symmetrically about said predetermined axis and expanding in said predetermined direction to define strong magnetic field lines crossing said axial current density lines and divergent with respect thereto, the ratio of the field strength of said magnetic field to the ambient pressure in the region of axial current flow being sufficient to maintain the product of the particle cyclotron frequency in cycles and the particle means collision time in seconds greater than unity for the electrons in said plasma.

4. The plasma accelerator apparatus defined in claim 2, wherein said cathode and anode electrodes define sufficiently angular surface contours to cause an electric field concentration thereat.

5. The plasma accelerator apparatus defined in claim 2, wherein said field coil is axially centered between said cathode and anode electrodes and extends axially therebeyond.

6. The plasma accelerator apparatus defined in claim 2, wherein said field coil axially extends between said cathode and anode electrodes and extends therebeyond in said predetermined direction.

7. The plasma accelerator apparatus defined in claim 2, further including magnetic means disposed adjacent said annular field coil for affecting the configuration of said magnetic field to provide predominately axial field components in the region between said cathode and anode electrodes and a radially expanding magnetic field downstream therefrom in said predetermined direction.

References Cited

UNITED STATES PATENTS

| | | | |
|---|---|---|---|
| 3,209,189 | 9/1965 | Patrick | 313—231 X |
| 3,151,259 | 9/1964 | Gloersen et al. | 313—231 X |
| 3,226,592 | 12/1965 | Gough et al. | 313—161 X |

JAMES W. LAWRENCE, *Primary Examiner.*

S. A. SCHNEEBERGER, *Assistant Examiner.*

UNITED STATES PATENT OFFICE
CERTIFICATE OF CORRECTION

Patent No. 3,388,291                                                   June 11, 1968

Gordon L. Cann

It is certified that error appears in the above identified patent and that said Letters Patent are hereby corrected as shown below:

Column 1, line 36, after "3,309,873." insert the following:

The invention described herein was made in the performance of work under a NASA contract and is subject to the provisions of Section 305 of the National Aeronautics and Space Act of 1958, Public Law 85-568, (72 Stat. 435; 42 U.S.C. 2457).

Column 12, lines 28 and 29,'"downstream of all structural components"'should read -- downstream of all structual components --; line 44, "generating" should read -- generating, --.

Signed and sealed this 13th day of January 1970.

(SEAL)
Attest:

EDWARD M. FLETCHER, JR.                        WILLIAM E. SCHUYLER, JR.
Attesting Officer                                     Commissioner of Patents